(12) United States Patent
Jones et al.

(10) Patent No.: US 11,746,811 B2
(45) Date of Patent: Sep. 5, 2023

(54) CONNECTOR PIN

(71) Applicant: Signature Systems Group, LLC, Flower Mound, TX (US)

(72) Inventors: Chad H Jones, Frisco, TX (US); Marcos Gonzalez, North Richland Hills, TX (US)

(73) Assignee: Signature Systems Group, LLC, Flower Mound, TX (US)

( * ) Notice: Subject to any disclaimer, the term of this patent is extended or adjusted under 35 U.S.C. 154(b) by 897 days.

(21) Appl. No.: 16/582,077

(22) Filed: Sep. 25, 2019

(65) Prior Publication Data

US 2021/0088061 A1    Mar. 25, 2021

(51) Int. Cl.
F16B 5/06 (2006.01)
F16B 21/02 (2006.01)

(52) U.S. Cl.
CPC .......... F16B 5/0621 (2013.01); F16B 21/02 (2013.01)

(58) Field of Classification Search
CPC ........ F16B 5/0621; F16B 21/02; F16B 21/04; F16B 5/10; F16B 5/0642; Y10T 403/7005; Y10T 403/7007
See application file for complete search history.

(56) References Cited

U.S. PATENT DOCUMENTS

| 3,123,389 | A |   | 3/1964 | Biesecker |
| 3,744,101 | A | * | 7/1973 | Gley ...................... F16B 21/02 24/453 |
| 3,811,154 | A |   | 5/1974 | Lindeman et al. |

(Continued)

FOREIGN PATENT DOCUMENTS

DE    1984832    5/1968
EP    1923181 B1    6/2011
(Continued)

OTHER PUBLICATIONS

International Searching Authority; International Search Report and Written Opinion of the International Searching Authority; International Application No. PCT/US20/52712; Patent Cooperation Treaty; pp. 1-9; publisher United States International Searching Authority; Published Alexandria, Virginia, US; copyright and dated Dec. 31, 2020 (9 pages).

*Primary Examiner* — Matthew R McMahon
(74) *Attorney, Agent, or Firm* — METZ LEWIS BRODMAN MUST O'KEEFE LLC

(57) ABSTRACT

A connector pin includes a stem extending between a head and an opposite foot. The stem includes a neck having a plurality of sections which may be planar forming edges. A retention member including a collar and arms extending therefrom is retained around said pin, the inner surface of the collar correspondingly configured to the sections and edges of the neck for a frictional fit. The pin is insertable and retained within a receiver in overlapping mats. Pockets in the receiver hold the retention member arms and prevent rotational motion of the retention member. The pin is selectively movable relative to the retention member by rotational motion by application of force to the pin sufficient to overcome the threshold level of friction holding the sections of the neck at the collar. Locking the pin is achieved when extension members of the pin foot are misaligned with the retention member arms.

25 Claims, 8 Drawing Sheets

(56) References Cited

U.S. PATENT DOCUMENTS

| | | | |
|---|---|---|---|
| 4,047,266 A * | 9/1977 | Bisbing | F16B 21/04 |
| | | | 411/349 |
| 4,498,827 A * | 2/1985 | Mair | A44B 99/005 |
| | | | 24/691 |
| 6,612,795 B2 | 9/2003 | Kirchen | |
| 6,722,831 B2 * | 4/2004 | Rogers | F16B 21/02 |
| | | | 411/553 |
| 7,303,800 B2 * | 12/2007 | Rogers | B32B 3/02 |
| | | | 428/44 |
| 8,262,333 B2 * | 9/2012 | Bucker | F16B 21/086 |
| | | | 411/999 |
| 8,388,291 B2 * | 3/2013 | Rogers | F16B 21/02 |
| | | | 24/453 |
| 8,414,217 B2 | 4/2013 | Rosan | |
| 8,657,545 B2 * | 2/2014 | Magno, Jr. | F16B 7/187 |
| | | | 248/316.1 |
| 8,936,374 B1 | 1/2015 | Royse | |
| 9,068,584 B2 | 6/2015 | McDowell et al. | |
| 9,506,255 B1 * | 11/2016 | Jones | E04F 15/02033 |
| 9,850,926 B2 * | 12/2017 | Buchanan | B62J 11/00 |
| 9,982,699 B2 | 5/2018 | Risdale | |
| 10,266,994 B2 | 4/2019 | McDowell et al. | |
| 11,041,520 B2 * | 6/2021 | Sbongk | F16B 21/02 |
| 2004/0005430 A1 | 1/2004 | Rogers | |
| 2013/0287486 A1 * | 10/2013 | Tseng | F16B 5/10 |
| | | | 403/314 |

FOREIGN PATENT DOCUMENTS

| | | | |
|---|---|---|---|
| FR | 1373375 | 9/1964 | |
| FR | 2817927 | 8/2000 | |
| JP | 2012149731 A * | 8/2012 | |
| RU | 185392 U1 | 4/2018 | |
| RU | 185392 U1 * | 12/2018 | |
| WO | WO-2012099212 A1 * | 7/2012 | A47B 87/007 |
| WO | WO2016128741 A1 | 8/2016 | |
| WO | WO2018089045 A1 | 5/2018 | |

* cited by examiner

CONNECTOR PIN

FIELD OF THE INVENTION

This invention relates to fasteners, and more particularly, to fasteners used to connect modular flooring mats for temporary roadways and flooring.

BACKGROUND

Modular flooring mats and systems are commonly used in industrial, construction and event applications to provide temporary roadways or flooring in outdoor or indoor environments. These temporary floors are assembled from a plurality of modular floor mats connected to one another in adjacent and/or overlapping fashion. There are a wide variety of ways known to connect such floor mats in assembling a temporary flooring, including fasteners such as cam locks and pins which rotate between locked and unlocked positions. For example, in U.S. Pat. No. 7,303,800 discloses a locking mechanism comprising an offset cam lock and receiver in which the lock rotatably engages the receiver, turning prongs extending from the pin to engage with laterally oriented ledges in the mat. Thus, the prongs of the rotatable pin restrain or hold the lock in position. In U.S. Pat. No. 8,388,291, a mat lock pin is disclosed for releasably holding mats together. The lock pin includes a rotor having feet that, when the rotor is turned, brings the feet to bear against the outer surface of the mat, creating axial forces that hold the mats together. In U.S. Pat. No. 8,414,217, a cam lock and complimentary receiver are mounted in floor mats such that they mate and provide a compressive force to interlock adjoining mats.

U.S. Pat. No. 6,722,831 discloses a fastening device for connecting two overlapping mats with a pin insertable into aligning holes of the mats. The pin has a longitudinal bore extending throughout through which a rod extends. The rod shaft ends in a keeper and is rotatable relative to the surrounding pin with an Allen wrench to move the keeper from being aligned with the pin to being perpendicular to the pin for a locked position. The pin includes recesses that correspond to raised ridges in the shaft of the rod. The raised ridges are seated within the recesses of the pin and prevent free rotation of the rod within the pin body. However, these recesses and corresponding raised ridges are of geometries that require significant force to overcome and move between locked and unlocked positions.

With these and most other known fasteners for modular floor mats, the process of assembling the temporary flooring is time-consuming and laborious. It typically requires two people working together to position and lay the mats relative to one another, place the fasteners, and both people to collectively turn a large dedicated tool similar to an Allen wrench to provide enough force to rotate the cam locks and secure each fastener. This provides a secure fit between the mats so they do not come apart during use, such as by being shaken or rattled as vehicles and people travel repeatedly over the mats. However, it also means it can take hours to days to install a complete modular flooring system. It would be beneficial to have a modular mat and/or connector that was easier and faster to install while not sacrificing a secure connection.

SUMMARY

A pin for connecting adjoining floor mats is disclosed which reduces the time and energy necessary to assemble and install modular flooring mats. The pin of the present invention allows for easy turning between locked and unlocked positions such that a single person can lock or unlock the pin. Despite the ease of use, the geometries of the pin are such that it provides sufficient frictional forces to retain the pin in the locked position and prevent it from being inadvertently rotated out of a locked position, such as from vibration from traffic along the modular flooring system.

The pin of the present invention includes a head at a first end and a foot at an opposite second end, with a stem extending therebetween. The head includes a recess configured to receive an Allen wrench or similar tool to facilitate turning of the pin to change between unlocked and locked positions. The foot has extension member(s) extending outwardly from the foot that coordinate with the surrounding mat(s) to hold the mats together when the pin is locked. A portion of the pin stem defines a neck that includes a plurality of sections collectively forming a pattern or relief, such as but not limited to planar sections arranged adjacent to one another to form edges where they join. In at least one embodiment, there may be sixteen planar sections providing a hexadecagonal configuration of the neck.

The pin also includes a retention member engaging at least a portion of the pin in a frictional fit to retain the pin in a particular position. The retention member includes a collar correspondingly configured to the neck of the pin stem. In at least one embodiment the retention member is formed around the pin as a mold such that the collar and stem are complementary in shape with one another. Accordingly, in at least one embodiment the collar of the retention member also has a multi-sided such as hexadecagonal configuration or cross-section similar to that of the neck of the pin. The corresponding geometries of the collar and neck are such that a frictional fit is formed therebetween, the collar restricting rotational movement of the pin neck relative thereto until sufficient force is provided. Once sufficient force is provided to overcome a threshold level, the collar or neck may be configured to temporarily deflect and permit selective movement of one relative to the other, such as by rotation, until the geometries again catch on one another and form a frictional fit. In at least one embodiment, the retention member is made of more resilient material than the pin and the collar temporarily deforms to permit movement of the neck relative thereto.

The retention member also includes at least one arm extending from the collar which is configured to be retained within corresponding pocket(s) of the channel formed in mat(s) to receive the pin and surrounding retention member. The arm(s) prevent movement of the retention member in the channel, such as rotational motion, even when rotational force is applied to the pin. The arm(s) therefore help the retention member remain stationary within the channel despite movement of the pin. However, the retention member is not needed to hold or maintain the pin in the channel which connects adjoining or overlapping mats. Rather, the retention member only holds the pin in a particular rotational position, such as locked or unlocked, irrespective of the surrounding mats.

The locked and unlocked positions may be defined by the angular relationship of the extension members of the pin foot relative to the arms of the retention member. In at least one embodiment the extension members extend along a foot axis and the arms extend along an arm axis, where the foot and arm axes are spaced apart and parallel to one another. An unlocked position may be defined when the extension members are aligned with the arms. A locked position may be defined when the extension members are misaligned from the arms. In at least one embodiment, a locked position may be defined when the extension members of the foot are positioned perpendicular to arms of the retention member.

Each mat of a modular flooring system includes at least one, preferably a plurality of channels formed therein and extending through the mat from one surface to the opposite surface. Each channel is configured to receive and retain a pin therein. The channel includes an opening which may be at or below the level of the mat surface and is dimensioned to receive the pin therein in an unlocked position. The channel extends away from the opening into the mat. The channel includes at least one pocket configured to receive and restrain the arm(s) of the retention member of the pin. The channel also includes at least one ramp configured to engage the extension member(s) of the foot of the pin, such as upon rotation and to achieve and maintain locked position(s). Accordingly, the channel is dimensioned to permit the pin to selectively rotate therein when moving between an unlocked and locked positions, while restricting rotational movement of the retention member. In at least one embodiment, a receiver may be selectively inserted into a bore formed in the mat. In such embodiments, the receiver includes the channel. Each mat may include its own receiver such that the channels thereof are aligned in registry with one another when the mats are overlapped, and the receivers therefore also align in registry and abut one another. In certain embodiments, the bores of the mats align in registry when the mats are overlapped and a single receiver extends through the aligned bores of both overlapping mats. In at least one embodiment, the ramp of one mat is configured to receive and retain the foot of a pin inserted through the opposing mat, thus securing the overlapping mats together. This ramp may be in the aligned receiver when two receivers or channels are present, or may be in the ramp furthest from the opening when a single receiver or channel extends through both overlapping mats.

The connector pin, together with its particular features and advantages, will become more apparent from the following detailed description and with reference to the appended drawings.

DESCRIPTION OF THE DRAWINGS

Like reference numerals refer to like parts throughout the several views of the drawings.

DETAILED DESCRIPTION

Figure 1:
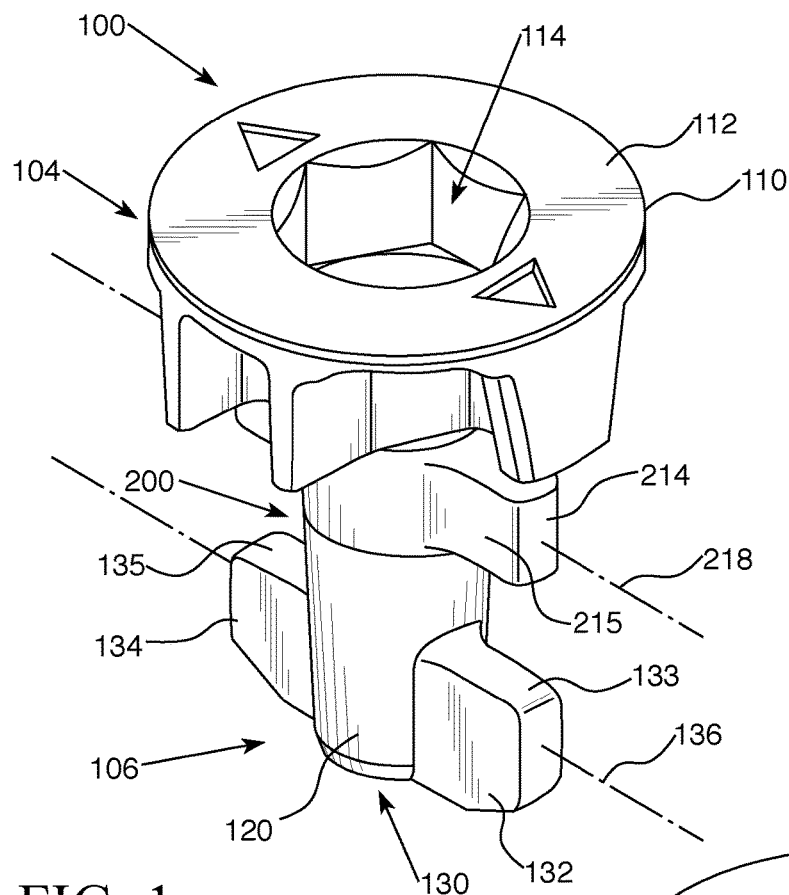
FIG. 1 is an isometric view of a connector pin of the present invention in a first unlocked position.

As shown in the accompanying drawings, the present invention is directed to a connector pin 100 that can be inserted into a channel 310 to join adjacent and/or overlapping floor mats 50 together to form a modular or temporary flooring system. As shown best in FIGS. 1-3, the pin 100 includes a first end 104 forming a top or head of the pin 100 and an opposite second end 106 forming a bottom or foot of the pin 100. At the first end 104, the pin 100 includes a head 110 having a face 112 and a recess 114 formed therein. The head 110 may have any suitable shape and dimension. In at least one embodiment, the head 110 is round and is dimensioned to fit within an opening 302 of a channel 310, discussed in greater detail below. A recess 114 extends away from the surface 112 of the head 110 by a portion of the depth of the head 110. In some embodiments, the recess 114 is not limited by the depth of the head 110 but rather extends through the pin 110 from the first end 104 to the second end 106. The recess 114 may be of any shape but in at least one embodiment is a hexagonal shape dimensioned to accommodate an Allen wrench of the kind and size used to install modular floor tiles, such as by insertion of the Allen wrench into the recess 114 and turning to rotate the pin 100 between locked and unlocked positions. The head 110 may include markings or indicia, such as but not limited to arrows, geometric shapes, pictorial images, drawings, logos and words, to indicate the position of the pin 100 within a channel 310 or receiver 300. In a preferred embodiment, the surface 112 of the head 110 includes indicia marking unlocked and locked positions, such as but not limited to arrows and/or an image of a lock that is locked or unlocked.

Figure 2:
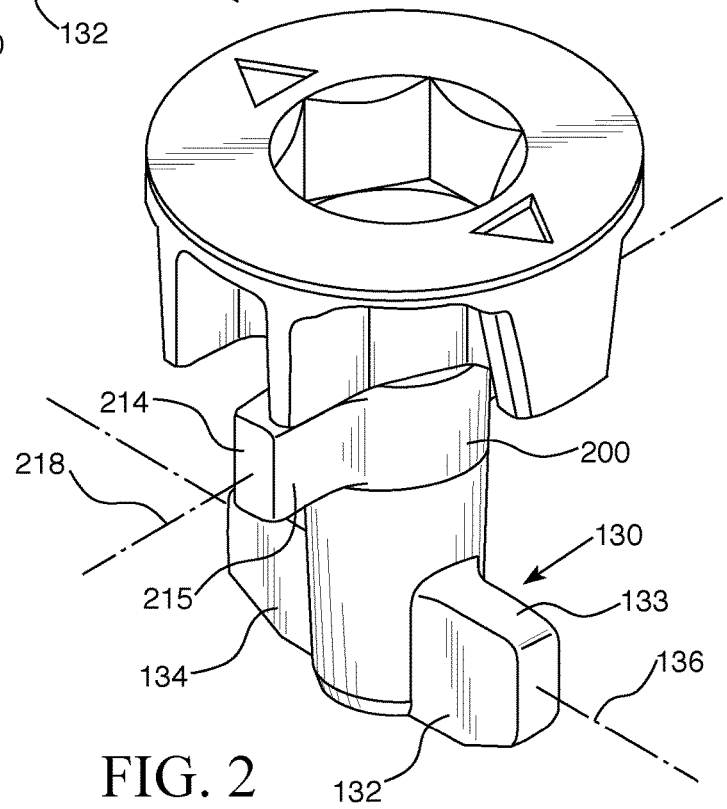
FIG. 2 is an isometric view of the pin of FIG. 1 in a second locked position.

The pin 100 further includes a stem 120 extending from the head 110 at the first end 104 to the second end 106. In at least one embodiment, the stem 120 may have a smaller diameter than the head 110, but in other embodiments the stem 120 and head 110 may have similar diameters. The stem 120 terminates in a foot 130 located at the second end 106 of the pin 100. The foot 130 may include at least one extension member extending radially outwardly from the stem 120. For instance, in the embodiment shown in the Figures the foot 130 includes a first extension member 132 and second extension member 134 each extending away from the stem 120 along a foot axis 136, as shown in FIGS. 1 and 2. Each extension member 132, 134 has a length that is less than the radius of the head 110 such that neither extension member 132, 134 extends beyond the perimeter of the head 110 when viewing the pin 100 along the longitudinal axis 103. The extension members 132, 134 each also include at least one engagement surface 133, 135, respectively, which are dimensioned to interact with portions of the channel 310 of a mat 50 to hold the pin 100 in a locked position, as described in greater detail below.

Figure 3:
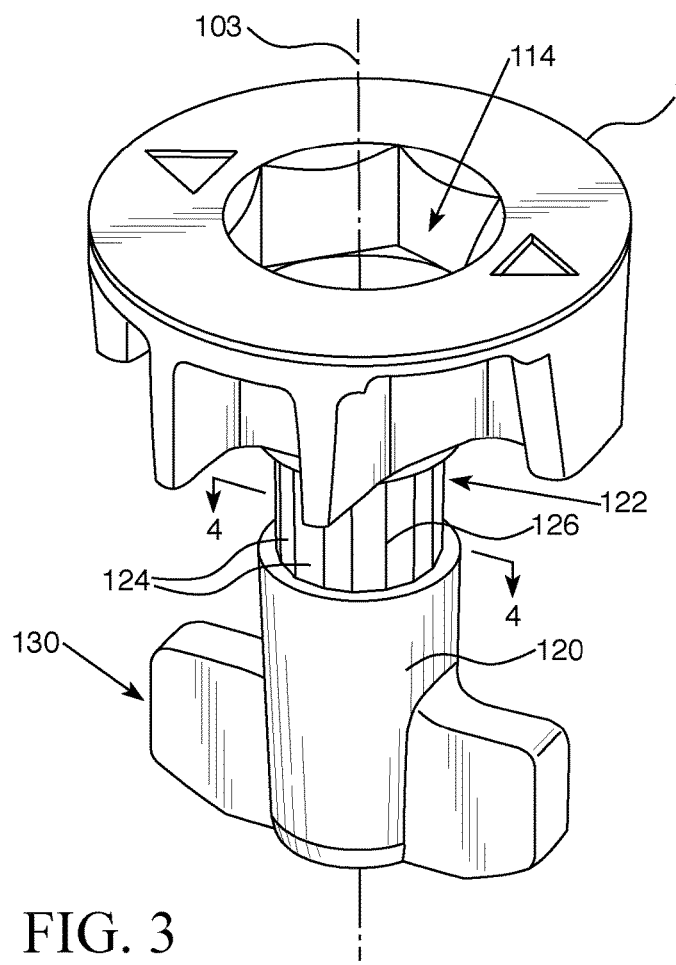
FIG. 3 is an isometric view of the pin of FIG. 1 without the retention member, revealing the neck.
Figure 4:
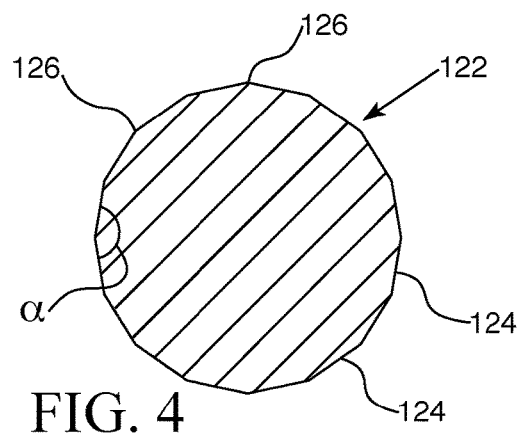
FIG. 4 is a cross-sectional view of FIG. 3 along line 4-4.

The stem 120 also includes a neck 122 defined along a portion of the stem 120 between the head 110 and foot 130. The neck 122 may be located anywhere along the length of the stem 120 and may be closer to the head 110, as shown in FIG. 3, or may be closer to the foot 130 or equidistant therebetween in other embodiments. The neck 122 is comprised of a plurality of sections 124 disposed contiguously about the neck 122, as best shown in FIG. 3. There may be any number of sections 124 included in the neck 122. For example, there may be at least six, ten, sixteen, twenty, or twenty-four sections 124, as a few non-limiting examples. In a preferred embodiment, there may be sixteen sections 124, forming a hexadecagonal neck 122, such as shown in FIGS. 3 and 4. The sections 124 collectively define the circumference of the neck 122. The sections 124 may be arranged in any pattern around the neck 122, which may include but is not limited to planar sections, linear sections, overlapping or intersecting patterns such as lattice structures and angled. In at least one embodiment, such as shown in FIG. 3, the sections 124 are planar and are disposed along a longitudinal axis 103 of the pin 100, such that edges 126 formed between adjacent planar sections 124 also extend in a longitudinal direction along the length of the neck 122.

In at least one embodiment, each section 124 joins an adjacent section to form angled edges 126. The included angle α of the edges 126 formed by the sections 124 depends on the number of sections 124 present. For instance, the included angle α, as shown in FIG. 4, may be about 90° when there are four sections 124 forming four edges 126. In other embodiments, there may be sixteen sections 124 and sixteen edges 126 forming a hexadecagon in which each edge 126 has an included angle α of about 157.5°. In other embodiments, there may be twenty sections 124 forming twenty edges 126 each having an included angle α of about 162°. In still other embodiments, there may be thirty sections 124 forming thirty edges 126 each having an included angle of about 168°. Although the embodiment shown in FIGS. 3 and 4 have equally sized sections 124 and included angles α of edges 126, in other embodiments the sections 124 may sized differently from one another such that included angles α of edges may not be uniform throughout the neck 122.

The head 110, stem 120, neck 122, sections 124, foot 130 and extension members 132, 134 may all preferably be made of the same material. In at least one embodiment these components may be forged or cast as a monolithic or unitary piece. The above components of the pin 100 may be formed of any suitable material, such as but not limited to metals and metal alloys, including but not limited to stainless steel and aluminum.

Figure 5:
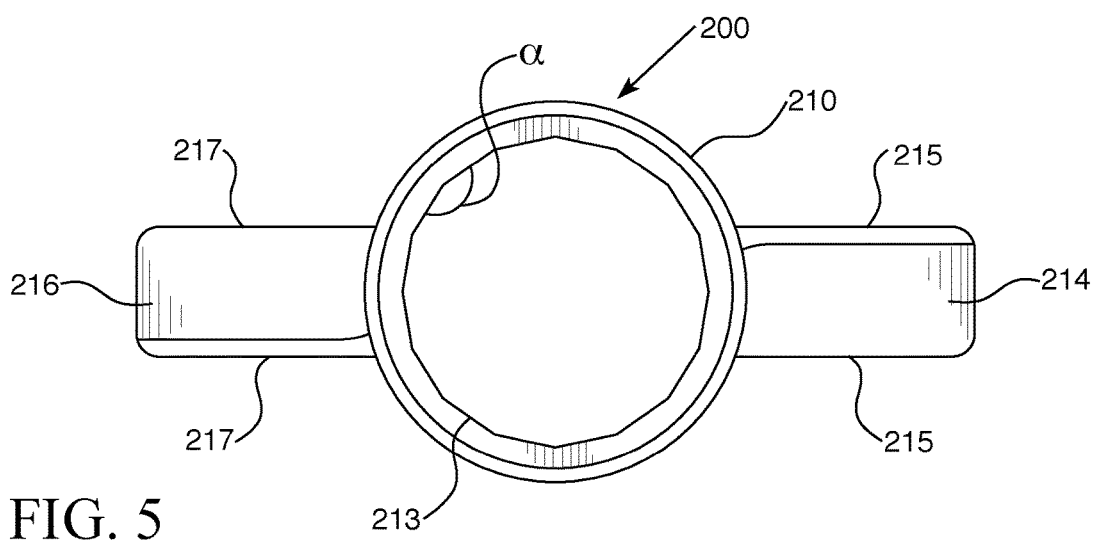
FIG. 5 is a top view of the retention member.
Figure 6:
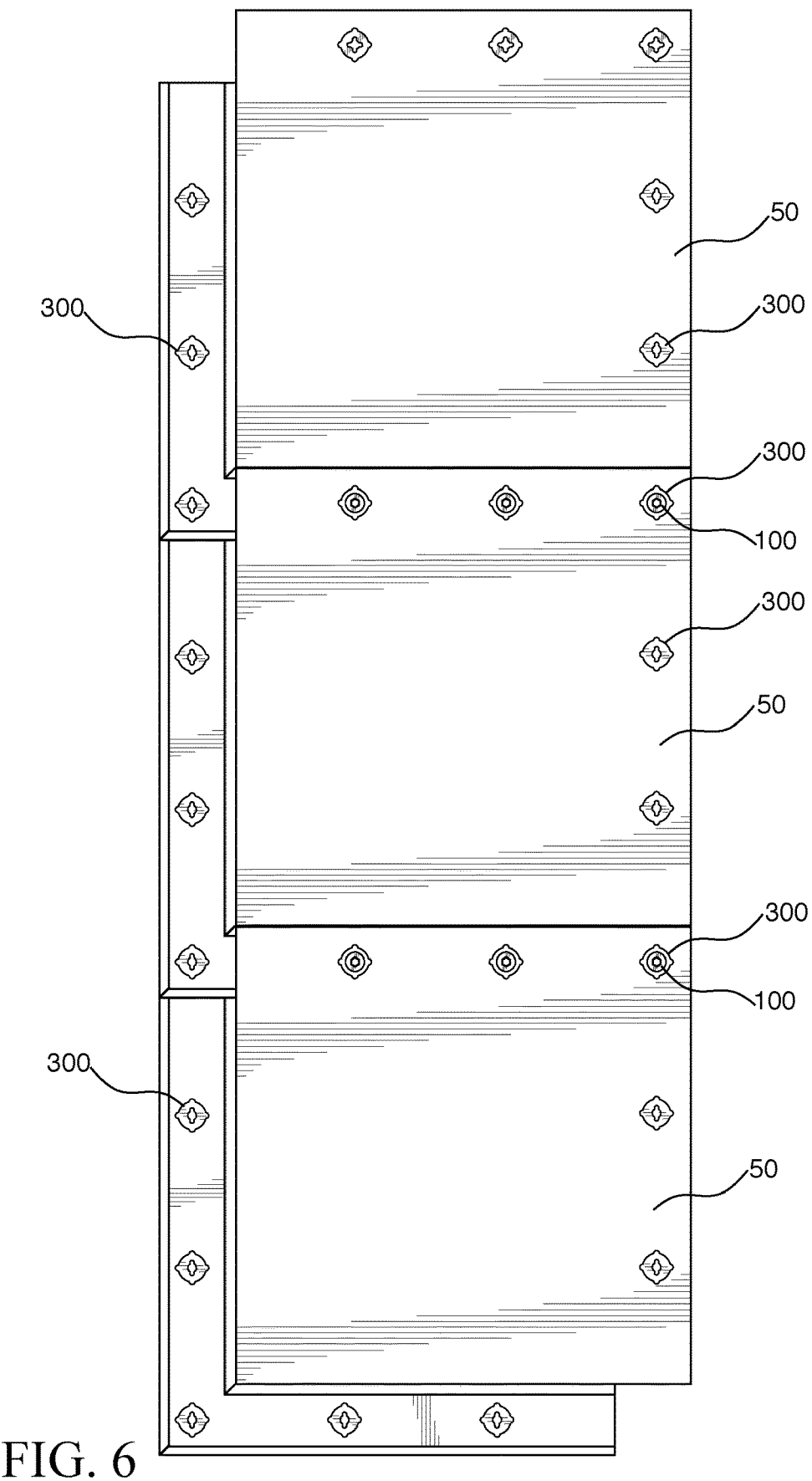
FIG. 6 is a top plan view of overlapping mats showing a plurality of receivers for connecting adjacent mats.

The pin 100 also includes a retention member 200 dimensioned to fit snugly around the neck 122. Indeed, in at least one embodiment the retention member 200 may be formed around the pin 100, such as by injection molding in a die in which the pin 100 is placed. As best shown in FIGS. 4 and 5, the retention member 200 includes a collar 210 having an inner surface 213 or circumference that is correspondingly shaped and dimensioned to the outer surface of the neck 122. Specifically, the inner surface 213 of the collar 210 may have a similar, but slightly larger diameter than the neck 122 of the pin 100 and is correspondingly formed to the neck 122 of the pin 100. For instance, the inner surface of the collar 210 may also include a plurality of sections that correspond with the sections 124 of the pin neck 122. For example, when the retention member 200 is formed around the pin 100, the sections 124 of the neck 122 dictate the inner surface 213 of the collar 210 of the retention member 200. The inner surface 213 of the collar 210 may comprise any pattern or configuration as would correspond to the pattern, shape and/or dimensions of the neck 122 of the pin 100. Accordingly, the inner surface of the collar 210 may also have a number of included angles α substantially similar in size, positioning and angle to the included angles α of corresponding edges 126 of the neck 122 discussed above.

The retention member 200 further includes at least one arm extending outwardly from the collar 210. In at least one embodiment, the at least one arm extends away from the collar 210 transverse to the longitudinal axis 103 of the pin 100. In at least one embodiment, the retention member 200 includes a plurality of arms extending from the collar 210. The arms may extend radially outwardly from the collar 210 by a length that is less than the radius of the head 110 of the pin 100. The arms 214, 216 may be positioned at any angle relative to one another along the circumference of the collar 210. For instance, as shown in FIGS. 1, 2 and 5, a first arm 214 and second arm 216 extend outwardly in opposite directions from the collar 210 along an arm axis 218 defined by the path between the two arms 214, 216. Although two arms 214, 216 are shown, any number of arms may be present and may extend by any length from the collar 210, which may be the same or different lengths from one another. In other embodiments, the arms 214, 216 may be positioned at other angles relative to one another, such as but not limited to 45°, 60°, 72°, 90° and 120°. The arms 214, 216 may have any shape, such as a planar linear shape shown in FIGS. 1 and 2, may be rounded, curved, curvilinear, angular or other shapes. In at least one embodiment, as shown in FIGS. 1 and 2, the arms 214, 216 of the retention member 200 may have similar shapes and sizes compared to the first and second extension members 132, 134 of the foot 130 of the pin 100. This is not a requirement, and in other embodiments the arms 214, 216 may have different shapes and/or sizes compared to the first and second extension members 132, 134 of the foot 130. The arms 214, 216 each also have at least one engagement surface 215, 217, respectively, which are dimensioned to interact with portions of the channel 310 of a mat 50 to hold the pin 100 in a locked position, as described in greater detail below. As shown in FIG. 5, each side of an arm 214, 216 may have an engagement surface 215, 217 for bidirectional engagement.

In at least one embodiment, the arms 214, 216 and collar 210 of the retention member 200 are preferably integrally formed of a unitary construction and from the same material. It is contemplated, however, that in certain embodiments the arm(s) 214, 216 and collar 210 may be made of different materials from one another. It is also contemplated that in some embodiments the arm(s) 214, 216 may be securely attached or affixed to the collar 210 to form the retention member 200. The retention member 200 may be made of a different material than the pin 100. For instance, as noted above, the retention member 200 is formed around the neck 122 of the pin, such as by molding. Accordingly, the retention member 200 may be made of plastic or a polymeric material as compared to the metal or metal alloy of the pin 100. Preferably, the resiliency or "give" of the materials making up the pin 100 and retention member 200 are different. For instance, the pin 100 may be made of sturdier material that is less likely to flex or temporarily deform, and the retention member 200 may be made of more resilient material that will bend, flex or temporarily deform with less pressure than that of the pin 100. This difference in resiliency may be slight. The resiliency of the materials may also be described in terms of hardness of the materials, which may be measured by Rockwell durometer. For instance, the pin 100 may have a hardness preferably about 60 on the Rockwell B scale in at least one non-limiting embodiment. The retention member 200 may have a hardness preferably about 65 on the Rockwell R scale in at least one non-limiting embodiment, though other hardness are also contemplated and within the scope of the device.

The collar 210 of the retention member 200 is correspondingly dimensioned to the neck 122 of the stem 120 so it fits snugly with a frictional fit against the neck 122. The pattern of the neck 122 may also be mirrored in the collar 210 of the retention member 200 so that a frictional grip is formed therebetween. Because of this frictional fit, and the shape or configuration of the pattern on the neck 122 and collar 210, the retention member 200 and stem 120 are held in place relative to one another. However, sufficient force of at least a threshold amount may be applied to overcome this frictional fit and move the stem 120 relative to the retention member 200, or vice versa. Accordingly, the stem 120 and retention member 200 are selectively movable relative to one another by the application of sufficient energy to overcome the stationary positioning such as from the frictional fit therebetween. Energy applied that is less than the threshold level does not result in movement of components of the pin 100 relative to one another. In certain embodiments, this threshold level of energy is in the range of 3 to 8 ft lbs. In at least one embodiment, the threshold level is about 5 ft lbs. In other embodiments, the threshold may be defined in other units of force, such as but not limited to Newtons (N). In still other embodiments, the threshold may be defined in terms of torque applied, such as at least 6.779 Newton meters (NM) or 5 ft lbs. Regardless of how the force is defined, the threshold level is higher than the levels typically experienced by floor mats during use, such as may be caused by vehicles or people moving over the floor mats even when carrying heavy loads. The shaking and vibration of typical use of floor mats is therefore insufficient to vibrate or rattle the stem 120 and retention member 200 enough to rotate them relative to one another.

Figure 7:
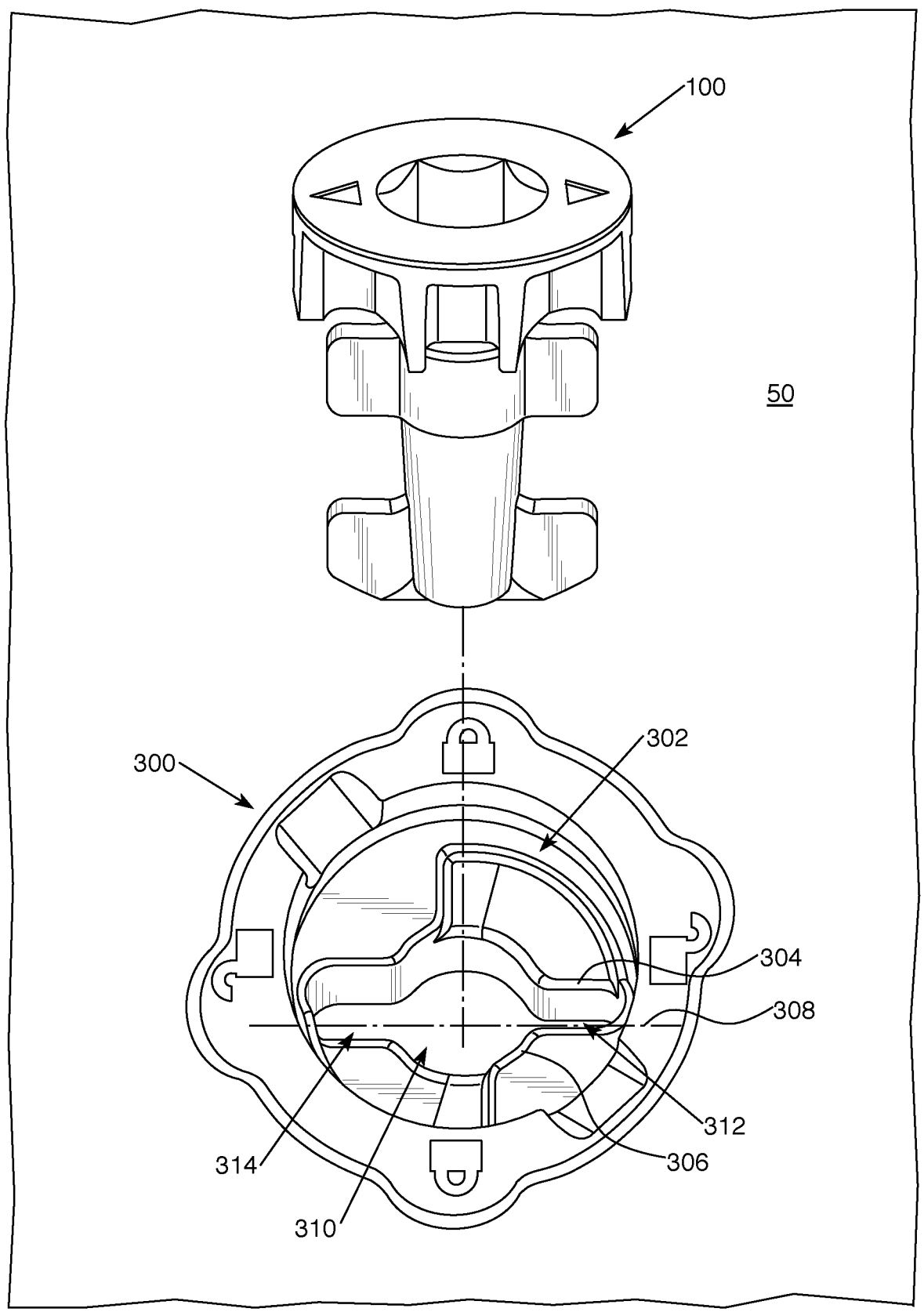
FIG. 7 is a top isometric view of the connector pin of FIG. 1 aligned with a corresponding receiver in one of joining floor mats.

With reference to FIGS. 6-10, each floor mat 50 includes at least one, but preferably a plurality of channels 310 extending through the mat 50 from one surface to the opposite surface. The channels 310 are positioned along each mat 50 to provide connection points between the mats 50. Accordingly, channels 310 may be located at the corner(s) of the mat 50 and may additionally be located along the edges of the mat 50 as well. Any number of channels 310 may be located in each mat 50 and may be positioned anywhere along the mat 50, but in at least one embodiment are positioned proximate to the corners and/or edges of the mat 50. Preferably, each mat 50 has a similar number and positioning of channels 310. The channels 310 may be integrally formed within the mat 50 or may be formed in a receiver 300 that is inserted into corresponding bores within the mat 50, as shown in FIG. 7. In some embodiments, the receivers 300 may also be secured to the mat 50 upon insertion, such as but not limited to by welding, adhering, or fastening with screws, bolts, pins or other fasteners. The receivers 300 may be made of the same material as the surrounding mat 50, such as but not limited to plastics and polymeric materials such as high-density polyethylene (HDPE) exhibiting high levels of strength. In other embodiments, the receivers 300 may be made of metals or metal alloys such as but not limited to aluminum or stainless steel.

Figure 8A:
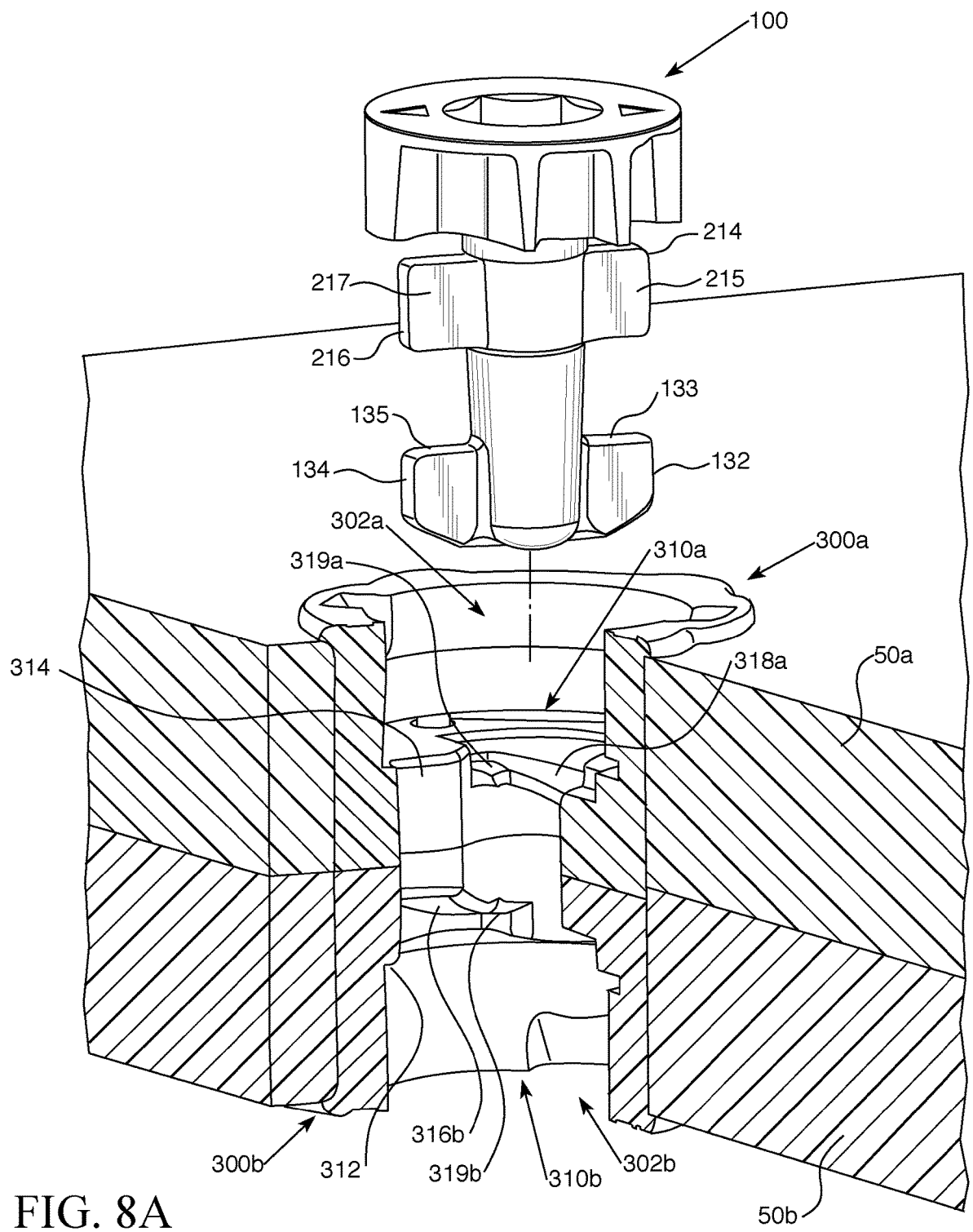
FIG. 8A is partial cross-sectional view of the receiver and floor mats of FIG. 7 showing the details of one embodiment of the receivers and channel.

In at least one embodiment, when adjacent mats 50a, 50b are aligned for attaching to one another, as shown in FIG. 8A, the channels 310a, 310b of each mat 50a, 50b align with one another. In other embodiments, as in FIG. 8B, a single channel 310 extends through both mats 50a, 50b. The pin 100 discussed above may be inserted into the channels 310 to lock the mats 50a, 50b together.

Each channel 310 has an opening 302 positioned at or near the surface of the mat 50 and into which the foot 130 of the pin 100 is inserted. For instance, the opening 302 may be flush with the surface of the mat 50 in some embodiments. In other embodiments, such as shown in FIGS. 7-10, the opening 302 may be slightly lower than the surface of the mat 50, such as recessed into the mat 50 by an amount sufficient to receive the head 110 of the pin 100 therein so the face 112 of the pin 100 is flush with the surface of the mat 50 when fully installed.

Regardless of the depth of the opening 302, the opening 302 is shaped and dimensioned to receive the pin 100, such as the foot 130, therein. In at least one embodiment, the opening 302 is similarly shaped and dimensioned to the foot 130 and stem 120 of the pin 100. Accordingly, in at least one embodiment as shown in FIG. 7, the opening 302 may include at least one elongate portion 304 that corresponds with the configuration of the foot 130 of the pin 100, such as the length defined by the first and second extension members 132, 134 of the foot 130. Accordingly, the opening 302 may have an opening axis 308 that corresponds to the foot axis 136 of the pin 100. In embodiments where the foot 130 is not linear and extension members 132, 134 extend at angles relative to one another, multiple elongate portions 304 of the opening 302 may be present to accommodate the geometry of the foot 130 and extensions thereof. In certain embodiments, the opening 302 may also include a rounded portion 306 to accommodate the diameter of the stem 120 of the pin 100, such as when the diameter of the stem 120 exceeds the thickness of the extension members 132, 134.

The channel 310 is in fluid communication with the opening 302 and extends away from the opening 302 into the mat 50, such as toward the opposite surface of the mat 50. At least a portion of the channel 310 corresponds with and extends from the elongate portion 304 and rounded portion 306 of the opening 302 further into the mat 50. For instance, the channel 310 forms a first pocket 312 that extends from one side of the elongate portion 304 and is dimensioned to receive and restrict rotational motion of the first arm 214 of the retention member 200 by contacting an engagement surface 215 thereof. Similarly, a second pocket 314 may be formed in the channel 310 and extends from another part of the elongate portion 304 and is dimensioned to receive and restrict rotational motion of the second arm 216 of the retention member 200 by contacting an engagement surface 217 thereof. The channel 310 may have any number of pockets 312, 314 to accommodate the various arms 214, 216 of the retention member 200.

Figure 8B:
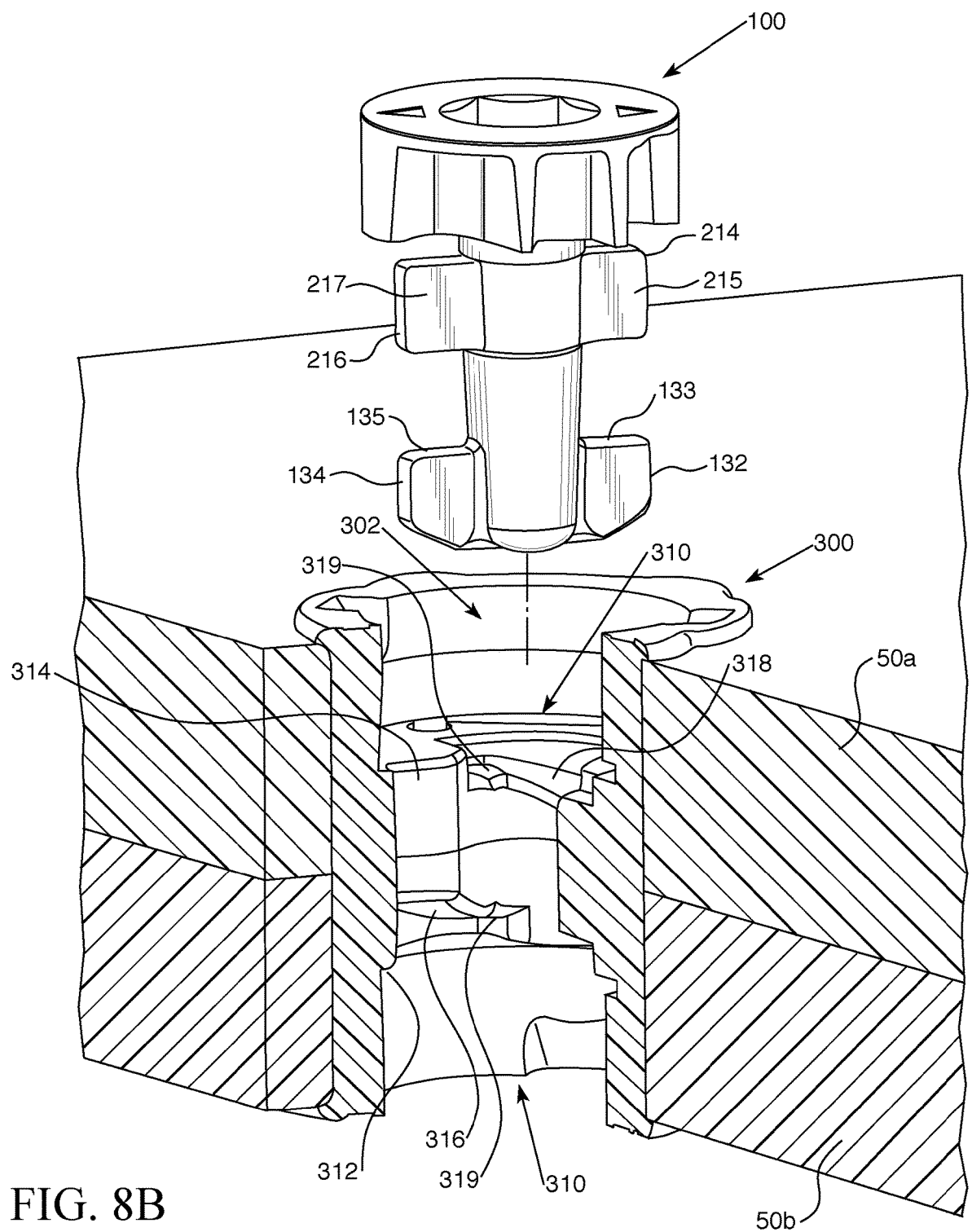
FIG. 8B is a partial cross-sectional view of the receiver and floor mats of FIG. 7 showing the details of a second embodiment of a single receiver and channels.

Accordingly, as the pin 100 is inserted into the channel 310, the foot 130 passes through the opening 302 and may be aligned with the elongate portion 304 and rounded portion 306 when such portions are present. Further insertion advances the pin 100 further into the channel 310 so the first and second arms 214, 216 are received and held in the first and second pockets 312, 314, respectively. The channel 310 may have any depth limited only by the depth of the mat(s) 50a, 50b. For instance, in at least one embodiment the channel 310a extends from the opening 302 through to the opposite surface of the mat 50a where it aligns with a similar channel 310b extending through the adjoining mat 50b, as in FIG. 8A. In other embodiments, such as where the channel 310 extends through both mats 50a, 50b such as by a single receiver 300, the channel 310 may also extend through both mats 50a, 50b, such as from the opening 302 of one mat 50a to the opening 302 of the adjoining mat 50b. The channel 310 may preferably beat least as deep as the length of the stem 120 and foot 130 of the pin 100. For instance, the pin 100 may be inserted through the channel 310 until the head 110 of the pin 100 is restricted from further movement by the opening 302, which is smaller in at least one dimension than the head 110. For example, the opening 302 may include a recess that forms a seat for the head 110 of the pin 100, as shown in FIGS. 8A and 8B. In the maximally inserted position, such as restricted from further insertion by the head 110, the foot 130 of the pin 100 preferably remains within the channel 310 and does not extend beyond the opposite surface of the collective mats 50a, 50b.

The channel 310 may also include at least one terminal portion 319 that is dimensioned to receive and retain the extension members 132, 134 thereon to hold the foot 130 of the pin 100 in place in the desired position. There may be an equivalent number of terminal portions 319 as there are extension members 132, 134 so each terminal portion 319 receives and retains a different extension member 132, 134. The terminal portions 319 may be substantially planar or parallel to the opening 302 and/or the surface of the mat 50a, 50b, although any suitable configuration is contemplated, including but not limited to dips, recesses, detents and the like. As can be appreciated from FIGS. 8A and 8B, the engagement surfaces 133, 135 of the extension members 132, 134 engage and/or push against the terminal portions 319 when the pin 100 is fully inserted and turned to a locked position. This interaction may contribute to maintain the position of the pin 100 in the receiver 300 and the adjoining mats 50a, 50b in association.

The receiver 300 may also include at least one ramp positioned or formed within the channel 310, as best shown in FIGS. 8A and 8B. In a preferred embodiment, the channel 310 may include a first ramp 316 and a second ramp 318 spaced apart from one another along the perimeter of the channel 310. For instance, the ramps 316, 318 may extend along at least a portion of the channel 310 in the longitudinal depth direction of the channel 310, the width direction around the perimeter of the channel 310, and/or a combination thereof. For example, the ramps 316, 318 may extend in a curved or curvilinear direction around a portion of the channel 310 in a combination of the longitudinal and transverse directions. The ramps 316, 318 may extend toward one another, away from one another, or be parallel to one another as disposed about the interior of the channel 310. Each ramp 316, 318 is configured and dimensioned to receive and movably engage an extension member 132, 134 of the foot 130 of the pin 100 thereon. There may be any number of ramps to correspond with the number and configuration of the extension members 132, 134 of the foot 130 of the pin 100.

Each ramp 316, 318 may begin and end anywhere within the channel 310, and in certain embodiments may extend the full length of the channel 310. In at least one embodiment, each ramp 316, 318 may begin adjacent or near the opening 302 and end at a terminal portion 319 as described above. As used herein, "near" the opening 302 means spaced apart from but still proximate to the opening 302, and "adjacent" means at or flush with the opening 302. The terminal portions 319 may be substantially planar or parallel to the opening 302 and/or the surface of the mat 50a, 50b in at least one embodiment, though they can have any configuration that would stop further movement of the extension members 132, 134, such as by interaction with the engagement surfaces 133, 135 thereof.

Each ramp 316, 318 may also have an incline angle relative to the opening 302 of the channel 310 such that the surface of the ramp 316, 318 begins adjacent or near the opening 302 and angles toward the cross-sectional center of the receiver 300. In embodiments in which a single channel 310 traverses both mats 50a, 50b, such as in a single receiver 300 of FIG. 8B, the ramps 316, 318 may be angled toward the center of the receiver 300 from each opening 302. In other embodiments having matching, aligned channels 310a and/or receivers 300a, such as in FIG. 8A, the ramps 316a, 318a may extend from at or near the opening 302a of a first mat 50a toward the opposite aligned channel 310b and/or receiver 300b of the second overlapping mat 50b. Similarly, the ramps 316b, 318b in the channel 310b of the second mat 50b extends from or near the opening 302b toward the channel 310a of the first mat 50a. In either case, the ramps 316, 318 may include a curved portion along their length as they follow the inner circumference of the channel 310. In at least one embodiment, the ramps 316, 318 may be mirror images of one another disposed at opposite sides of the channel 310 from one another. Each ramp 316a, 316b, 318a, 318b may include a terminal portion 319a, 319b, respectively, to interact with engagement surfaces 133, 135 of extension members 132, 134 to prevent further movement in an axial direction, such as along the length of the channel 310a, 310b and/or the longitudinal axis 103 of the pin 100.

The incline angle of the ramps 316, 318 may be any angle between 0° and 90°, such as but not limited to 45°. Because the foot 130 of the pin 100 moves along the ramps 316, 318, the incline angle is preferably sufficient to provide compressive forces against the mats 50a, 50b when the pin 100 is rotated toward the terminal portion 319 to a locked position. When the foot 130 reaches a terminal portion 319 of the channel 310, such as at the end of the ramps 316, 318, the pressure of the foot 130 against the terminal portion 319 holds the mats 50a, 50b together.

Figure 9:
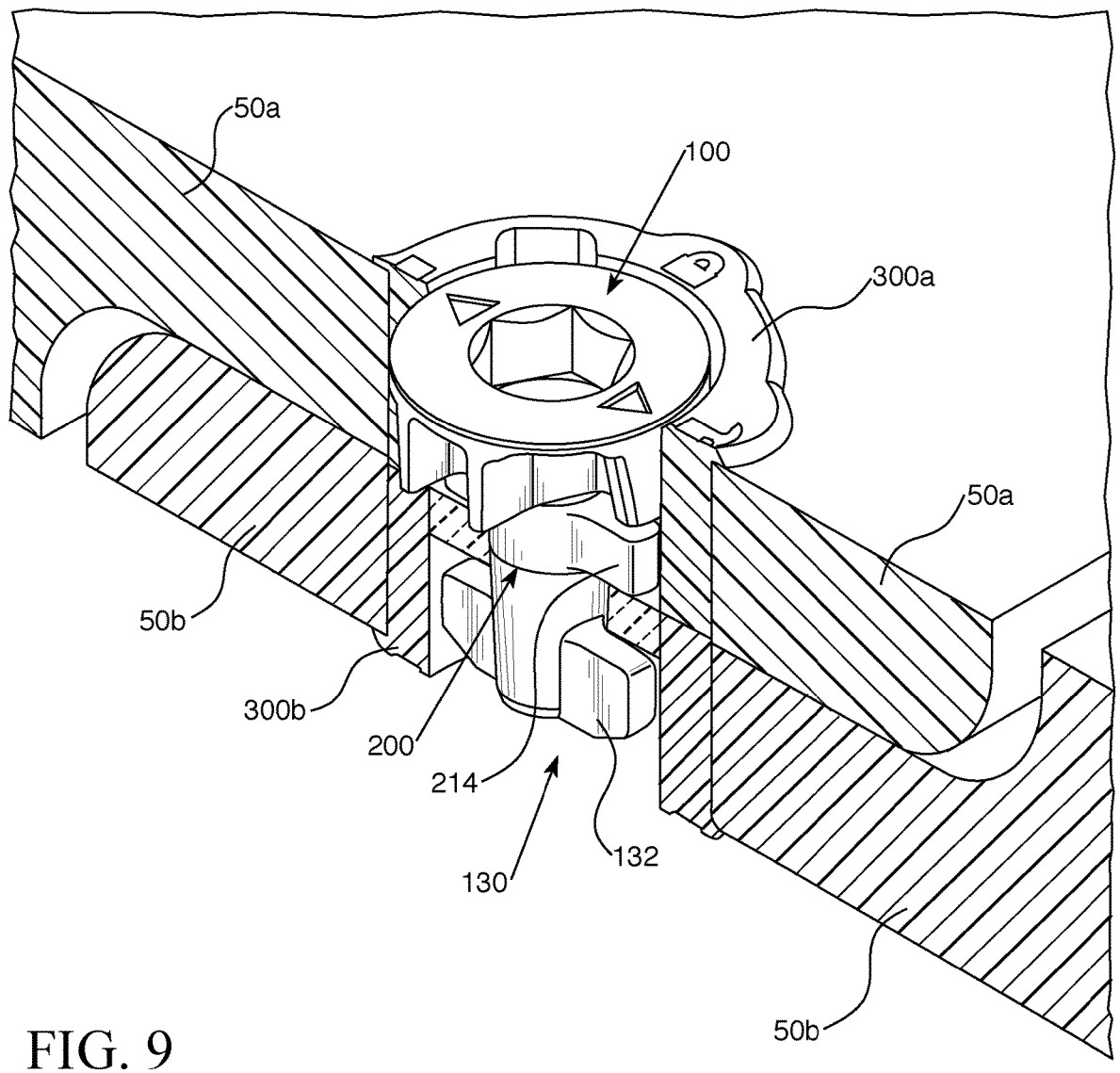
FIG. 9 is an isometric, partial cross-sectional view of the pin positioned within a corresponding receiver in an unlocked position.

To join adjacent mats 50a, 50b, the mats 50a, 50b are positioned next to and/or partially overlapping one another, as shown in FIGS. 6 and 8A-10. The channels 310a, 310b of respective mats 50a, 50b are aligned with one another, or a single receiver 300 having a single channel 310 is positioned through both mats 50a, 50b. A pin 100 is then inserted into the channel 310 by first inserting the foot 130 through the opening 302, as depicted in FIGS. 7-8B. For insertion, the pin 100 is in the unlocked position shown in FIGS. 1 and 8A-9. In this unlocked position, the foot axis 136 of the pin 100 is parallel to the arm axis 218 of the retention member 200 and the elongate portion 304 of the opening 302 of the channel 310a. Insertion progresses by inserting the foot 130, then stem 120 and retention member 200 into the channel 310a then opposing channel 310b. The pin 100 may be inserted until it is not longer capable of further movement into the channel 310a, such as when the head 110 is stopped by the narrower opening 302. In this position, the foot 130, specifically the extension members 132, 134, are received by, or at least aligned with, the ramps 316, 318 in the opposing channel 310b. The arms 214, 216 of the retention member 200 are retained within the pockets 312, 314 of the channel 310a. This unlocked position is shown in FIGS. 8A and 9.

To lock the pin 100, force is applied to the pin 100 sufficient to overcome the threshold level and selectively move at least one of the stem 120 of the pin 100 and retention member 200 relative to one other. In at least one embodiment, this force is applied by inserting an Allen wrench or other suitable tool into the recess 114 at the head 110 of the pin 100 and applying rotational force or torque to the tool. Once sufficient force is applied to overcome the threshold level, the frictional grip of the collar 210 on the neck 122 is released and the stem 120 rotates relative to the retention member 200. In this embodiment, the stem 120 rotates since it is connected to the pin 100 which is receiving the rotational force. The retention member 200 is held stationary by the first and second arms 214, 216 within their respective engagement surfaces 215, 217 contacting and pressing against the first and second pockets 312, 314 of the channel 310, which are configured to retain the arms 214, 216 in position and resist rotational movement. The collar 210, which is made of a more resilient material than the pin 100, temporarily bends or deflects to allow the neck 122 to move out of frictional engagement and rotate relative to the collar 210. Once the neck 122 has slipped out of frictional engagement with the collar 210, the collar 210 resumes its original shape. The rotation of the stem 120 relative to the collar 210 continues until the pattern at the interface between the outer surface of the neck 122 and the inner diameter of the collar 210 cause the neck 122 and collar 210 to catch on one another again in a new frictional fit or grip, such as when the next edge 126 of the neck 122 catches on the collar 210. Continued application of force exceeding the threshold level may drive further rotation of the stem 120 within the retention member 200 until the force is reduced below the threshold level.

In the embodiment described above, the applied force may be rotational force. It is also contemplated that non-rotational force may be used in other embodiments, such as but not limited to linear force in at least one direction. In addition, though it is described that the force is applied to the head 110 or stem 120, it is also contemplated that in other embodiments the force may be applied to the retention member 200 in addition to or instead of the head 110 of the pin 100. In such embodiments, the retention member 200 may rotate relative to a stationary pin 100. The pin 100 may be made of slightly resilient material and the retention member 200 may be more rigid, in which case the neck 122 of the pin 100 may temporarily deflect or bend to let the collar 210 of the retention member 200 move past and then return to its original shape once past. In still further embodiments, both the pin 100 and retention member 200 may move relative to one another, and either may be made of resilient material to accommodate selective movement of the other when sufficient force exceeding the threshold level is applied.

During rotation, the extension members 132, 134 move along the ramps 316, 318, respectively, until each reaches a terminal portion 319. As the extension members 132, 134 progress, the incline angle of the ramps 316, 318 draws the extension members 132, 134 along the same angle, providing compressive forces against the mats 50a, 50b.

The pin 100 may be rotated until a locked position is achieved. There may be any number of locked positions, such as one for each discrete formation in the pattern at the interface between the outer surface of the neck 122 and the inner surface 213 of the collar 210. For instance, there may be a locked position for each of the sections 124 or edges 126 of the neck 120. In the case of a hexadecagonal neck 120, there may be up to sixteen possible locked positions. Of course, there may be fewer locked positions than the possible discrete positions based on the pattern at the neck 120. For instance, a pin 100 having hexadecagonal neck 120 may still only have one, two, three, four or other number of locked positions. The locked positions may be dictated by the number of rotations of the Allen wrench or other tool used to apply force to the pin 100. For instance, in at least one embodiment, the locked positions may be defined by a number of rotations or fractions of a rotation of an Allen wrench or similar tool, such as a quarter of a turn, half a turn, an entire turn, or multiple turns. In at least one embodiment, as little as a quarter of a turn on an Allen wrench or similar tool is needed to navigate from an unlocked to a locked position.

Figure 10:
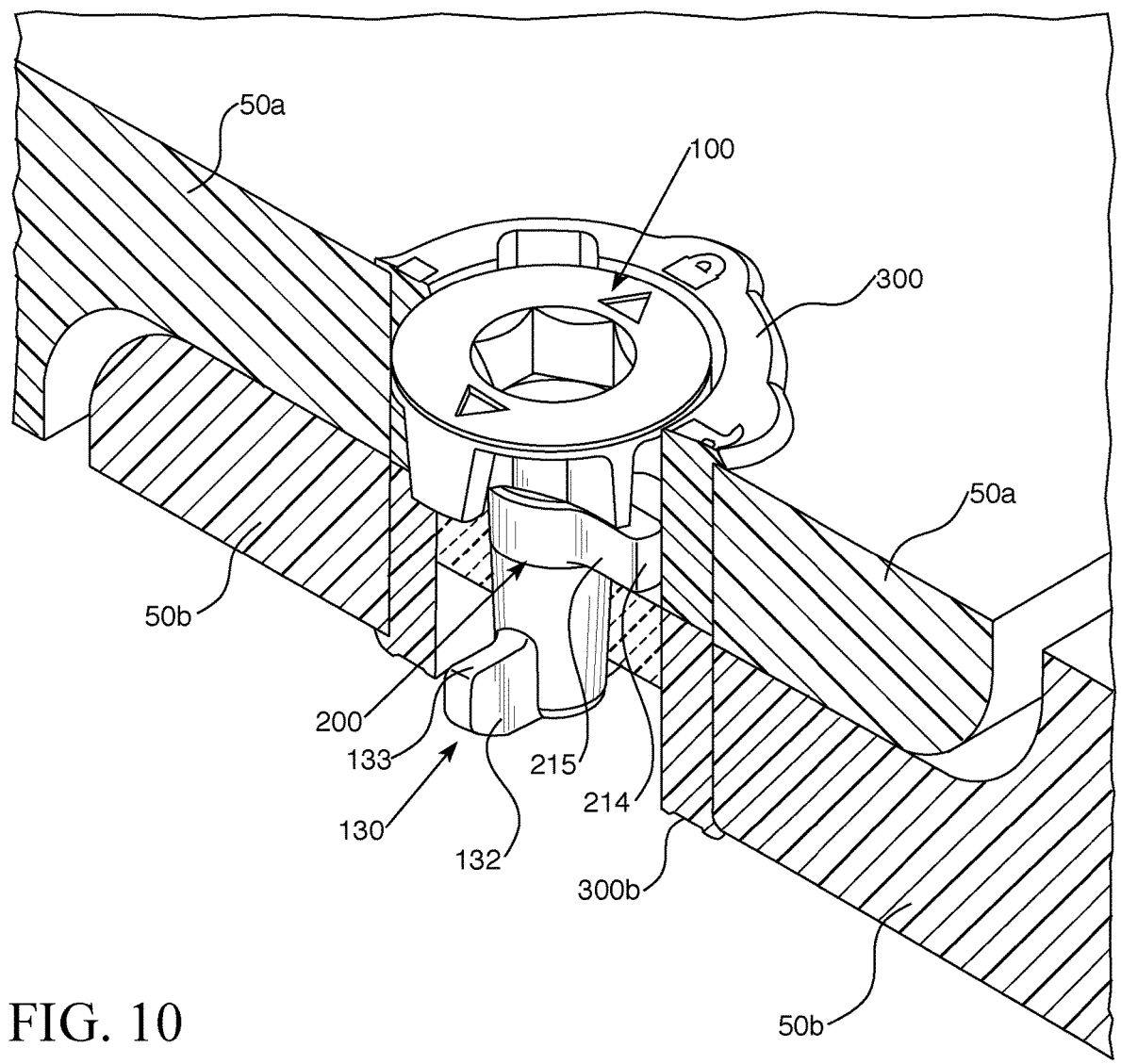
FIG. 10 is an isometric, partial cross-sectional view of the pin and receiver of FIG. 9 in a locked position.

Regardless of how achieved, the locked position(s) may be defined when at least one extension member 132, 134 of the pin 100 and at least one arm 214, 216 of the retention member 200 deviate from one another, such as when they become misaligned or no longer parallel. They may be disposed at any angle relative to one another in a locked position, which may be informed or dictated by the pattern(s) or sections 124 and/or edges 126 of the neck 122. In at least one embodiment, a locked position may be defined by the extension member(s) 132, 134 and arm(s) 214, 216 being perpendicular to one another as shown in FIGS. 2 and 10. This may provide optimal secure fit of two adjacent floor mats 50a, 50b. The locked position may also occur when the extension members 132, 134 have reached the terminal portions 319 of the ramps 316, 318 such that maximum compressive forces are applied to the mats 50a, 50b.

In a locked position, the arms 214, 216 of the retention member 200 are held within the pockets 312, 314 of the channel 310 in the receiver 300. The collar 210 in turn holds the neck 122 of the pin 100 in place because of the frictional fit therebetween. Notably, the frictional engagement that holds the pin 100 in the locked position is between the components of the pin 100 themselves rather than with the mat 50a, 50b, as is the case with existing connector pins. Because of this internal frictional fit, when vehicles or pedestrian traffic shake or rattle the mats joined together and locked with these pins 100, the vibrations imparted on the pin 100 do not shake or rattle the pin 100 loose from the locked position. Rather, the frictional fit with the retention member 200 holds the pin 100 in place in the locked position. The amount, intensity or frequency of vibrations from traffic or other use of the mats do not rise to the threshold level of friction necessary to overcome the frictional fit between the neck 122 and the collar 210, and therefore the collar 210 holds the neck 122 in place. The pattern or configuration of the neck 122 and collar 210 results in this frictional fit that resists movement short of the threshold level.

When it is desired to disconnect the mats 50a, 50b, the Allen wrench or other tool may again be inserted into the recess 114 at the head 110 of the pin 100 and rotational force applied. Force may be applied in the same or opposite rotational or angular direction as was applied to move to a locked position, depending on the embodiment. In at least one embodiment, force is applied in the opposite direction from locking. Once sufficient force is applied to overcome the frictional force between the neck 122 and the collar 210, the collar 210 temporarily deflects and permits the neck 122 to move or rotate relative thereto until the pattern, such as sections 124 and/or edges thereof pause or stop the movement. Overall movement of the pin 100 relative to the retention member 200 stops when the applied force falls below the threshold level of the frictional force between the neck 122 and the collar 210. This force may be repeatedly or continuously applied until the pin 100 is once again in the unlocked position shown in FIG. 9, at which point it may be removed from the channel 310. The mats 50a, 50b are now no longer connected and can be separated for transportation, storage or reuse.

The pin 100 of the present invention provides several benefits over existing known mat connectors or fasteners. For instance, the pin 100 may be turned to a locked position with less force than other fasteners, such as that disclosed in U.S. Pat. No. 6,722,831. The particular geometries of the neck 122 of the stem 120 and collar 210 of the retention member 200 are such that sufficient friction is created to avoid inadvertent rotational movement of one relative to the other, such as may be experienced by the mats from vibrations during vehicular or pedestrian traffic thereon, and yet the threshold level of force necessary to override this frictional fit is not as much as other fasteners require to turn. In embodiments of the present invention where the sections 124 of the neck 122 are planar, for example, the edges 126 formed where adjacent sections 124 meet are not ridges or extensions from the neck 122. Likewise, the correspondingly shaped inner diameter of the collar 210 does not include recesses like those of '831 patent. The ridges of the locking cylinder and corresponding recesses of the surrounding pin body in the '831 patent provide more than just a snug fit with one another. Because the ridges extend into and are retained within the recesses, significantly more force is required to overcome this configuration and move the ridges out of the recesses than is required by the pin 100 of the present invention where there are no recesses or corresponding members extending therein. Rather, the sections 124 of the neck 122 are frictionally held by the correspondingly shaped inner diameter of the collar 210.

This geometry, specifically in embodiments where the sections 124 of the neck 122 are planar, unexpectedly provides this resistance to inadvertent rotational movement. A recess holding a similarly shaped extension would prevent movement of two pieces relative to one another, as in the '831 patent. It is far from evident, however, that angled sections would provide sufficient friction to prevent movement of the two pieces relative to one another that results from traffic on temporary flooring mats. It is a common problem that these mats come unfastened from one another over time as they are jostled and vibrated from vehicular and pedestrian traffic. Providing tight fasteners that resist this shaking loose from one another require a significant amount of force to turn, and therefore set to locked positions. This increases the time needed for installation of modular flooring structures. Making the fasteners easier to turn, however, also makes them more susceptible to the vibrational loosening discussed above. The pin 100 of the present invention solves this problem without resorting to integrated configurations where one component is inserted into another. This in turn allows the pin 100 of the present invention to be more easily turned, even by a single person, which also increases the speed of modular flooring installation overall.

Since many modifications, variations and changes in detail can be made to the described preferred embodiments, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A pin for connecting modular floor mats, said pin comprising:
   a first end, an opposite second end and a stem extending along a longitudinal axis interconnected between said first and second ends;
   a head at said first end having a radius;
   a foot at said second end having at least one extension member extending along a foot axis transverse to said longitudinal axis, said at least one extension member having a length less than said radius of said head and an engagement surface configured to contact a portion of at least one of said modular floor mats;
   said stem having a neck defined along at least a portion thereof;
   a retention member disposed along a portion of said stem between said head and said foot, said retention member having:
   (i) a collar disposed circumferentially around said neck, selectively rotatable relative thereto, and forming a frictional fit with said neck to restrict incidental rotation of said stem relative to said retention member; and
   (ii) at least one arm extending from said collar entirely along an arm axis transverse to said longitudinal axis and by a distance less than said radius of said head, said at least one arm having an engagement surface configured to contact a pocket extending from a bore of at least one of said modular floor mats;
   wherein said pocket is correspondingly dimensioned to enclose, receive and frictionally restrain said arm of said pin from rotational motion about said longitudinal axis.

2. The pin as recited in claim 1, wherein said neck includes a plurality of sections contiguously disposed thereabout, wherein adjacent ones of said plurality of sections share a common edge along at least a portion of their length and each said edge is configured to provide said frictional fit with said collar and to restrict rotational motion.

3. The pin as recited in claim 2, wherein said plurality of sections each have a length substantially parallel to said longitudinal axis of said pin.

4. The pin as recited in claim 3, wherein said plurality of sections are planar.

5. The pin as recited in claim 3, wherein each said edge has an included angle in the range of 90°-170°.

6. The pin as recited in claim 5, wherein said included angle is in the range of 155°-165°.

7. The pin as recited in claim 2, wherein said neck and said collar are correspondingly shaped.

8. The pin as recited in claim 7, wherein said neck and said collar each include sixteen sections.

9. The pin as recited in claim 1, wherein said at least one arm extends radially outwardly from said collar, said at least one extension member extends radially outwardly from said foot, and said at least one arm is positionable between being aligned and misaligned relative to said at least one extension member by selective rotation of said retention member.

10. A system for assembling a plurality of modular floor mats, comprising:
    a first floor mat and a second floor mat each having at least one channel extending therethrough, said first and second floor mats configured to at least partially overlap one another such that said at least one channel of said first floor mat is aligned in registration with said at least one channel of said second floor mat;
    at least one pin each having:
    (i) a head;
    (ii) a stem extending along a longitudinal axis from said head;
    (iii) an extension member extending from said stem transverse to said longitudinal axis; and
    (iv) a retention member disposed about and forming a frictional fit with a portion of said stem, said retention member disposed entirely between said extension member and said head, said retention member having an arm extending radially outwardly from said stem between said head and said extension member and transverse to said longitudinal axis; and
    each of said at least one channel:
    (v) dimensioned to receive one of said at least one pin;
    (vi) having a pocket extending from said channel correspondingly dimensioned to enclose, receive, and frictionally restrain said arm of said pin from rotational motion about said longitudinal axis; and (vii) having a terminal portion dimensioned to receive and restrain said extension member of said pin from axial motion along said longitudinal axis.

11. The system as recited in claim 10, wherein said stem is selectively rotatable relative to said retention member by application of rotational force of at least a threshold level to said pin, wherein said threshold level is sufficient to overcome said frictional fit between said retention member and said stem.

12. The system as recited in claim 11, wherein said head includes a recess dimensioned to receive at least a portion of a tool for said application of rotational force to said pin.

13. The system as recited in claim 10, wherein said pin is selectively positionable within said channel between an unlocked position defined by said extension member and said arm being aligned, and a locked position defined by said extension member and said arm being misaligned.

14. The system as recited in claim 13, wherein said extension member and said arm are parallel and in registry in said unlocked position and are perpendicular and not in registry in said locked position.

15. The system as recited in claim 10, wherein said terminal portion of said at least one channel in said second floor mat is configured to receive and restrain said extension member of said pin extending through said at least one channel of said first floor mat from a surface of said first floor mat.

16. The system as recited in claim 10, further comprising a ramp formed in said channel and configured to receive said extension member of said pin there along.

17. The system as recited in claim 16, wherein said ramp extends along at least a portion of a perimeter of said channel.

18. The system as recited in claim 16, wherein said first and second floor mats each have a respective surface, wherein said at least one channel extends from a respective one of said surface of said first and second floor mats, and said ramp has an incline angle relative to said surface.

19. The system as recited in claim 18, wherein said incline angle is between 0° and 90°.

20. The system as recited in claim 19, wherein said incline angle is about 45°.

21. The system as recited in claim 16, wherein said ramp of said at least one channel in said second floor mat is configured to receive and restrain said extension member of said pin extending through said at least one channel of said first floor mat from a surface of said first floor mat.

22. The system as recited in claim 21, wherein said terminal portion is located along said ramp.

23. The system as recited in claim 10, wherein said first and second floor mats each have at least one bore extending therethrough and each of said at least one channel is formed in a receiver extending through said at least one bore.

24. The system as recited in claim 23, wherein said receiver extends through a corresponding said bore of at least one of said first and second floor mats.

25. The system as recited in claim 23, wherein said receiver is one of (i) integrally formed in said first and second floor mats, and (ii) selectively insertable in said first and second floor mats.

* * * * *